Patented Dec. 12, 1944

2,364,611

UNITED STATES PATENT OFFICE 2,364,611

COATED FLATTING AGENT AND PROCESS FOR MAKING THE SAME

László Auer, South Orange, N. J., assignor to Interchemical Corporation, New York, N. Y., a corporation of Ohio No Drawing. Application February 11, 1944, Serial No. 521,979

5 Claims. (Cl. 106—144)

This invention relates to organic flatting agents for use in the preparation of dull coating compositions, and to the compositions and finished articles containing said flatting agents. More particularly, it is directed to the production of an organic flatting agent characterized by unusual compatibility with typical film-forming materials combined, in the preferred form of my invention, with unusual retention of flatting power under adverse circumstances.

While many protective and decorative finishes are glossy, it is often desired to obtain finishes which are more or less matte and free from specular reflection, either for the decorative effect (as in furniture finishes) or for the utilitarian effect (as in finishes for photographic devices, where a non-reflecting surface is essential). Such an effect can be obtained by the use of very high percentages of pigment (e. g. flat wall paints, automobile undercoaters); but it is often desirable to get the same effect without loading the film with pigment, either because the film properties of a lightly pigmented finish are desired, or because a transparent finish is desired.

To obtain this effect, the coating composition may be designed with an unbalance of the various film-forming ingredients and solvents, so that a portion of the film is precipitated before complete evaporation of the solvent. A very satisfactory flatting effect may be obtained in this fashion; by careful compounding with certain classes of ingredients, exceedingly tough, transparent dull films are often obtainable. However, the method is not applicable to those classes of film-forming materials which cannot be precipitated and retain toughness of film. Furthermore, even with the best flat finishes of this type, the degree of flatness varies with the drying conditions, and uniform results cannot be obtained unless drying conditions are maintained absolutely uniform. Because of the difficulties involved in maintaining absolutely uniform drying conditions, this type of flat composition is used only in isolated instances.

The trade in general has adopted the use of powders which are relatively insoluble in the coating compositions, and which can be dispersed therein to yield films which are transparent because of the similarity in refractive index between the flatting agents and the film-forming solids, and are flat because of the fact that the insoluble flatting agents break up the light reaching the surface of the film. The flatting agents generally employed fall into two classes—inorganic transparent inert pigments, and organic flatting agents.

The common inorganic inerts are siliceous materials, such as infusorial earth, silica, silica gel, some talcs, etc. They are essentially pigments capable of staying on the surface of coatings while wet and during film formation, and which are transparent because their refractive indices approach those of the vehicle, and which are able to produce effective flatting because of the uneven surface so formed. They have three principal disadvantages. First, they are never perfectly transparent when a film of very low reflectivity is wanted. Second, they settle very badly to hard dry cakes upon storage. However, this appears to be a property associated with their particle size and shape. Finally, the films produced are essentially pigmented films, so that where high flexibility is desired, as in artificial leather, the films are unsatisfactory because they craze on flexing.

The common organic flatting agents comprise certain transparent uncolored heavy metal soaps (magnesium, the alkaline earth metals, zinc and aluminum soaps of fatty acids) and the waxes. These materials generally produce more transparent films than the inorganic flatting agents, since they are more nearly similar in refractive index to the film-forming agents. Furthermore, because of their low specific gravity, and because of their similarity in general constitution to the vehicles, they stay in suspension better, settling into flocculates which are easily stirred back into uniform dispersions. Because of these advantages, they are preferred for transparent interior finishes and the like. They have, however, certain marked disadvantages. While they do not weaken a film as badly as the inerts, films containing these agents also show crazing when flexed, as on artificial leather, except in the case of the most soluble soaps, which are extremely difficult to handle. Certain of the soaps hydrolyze when the films are exposed to water, causing an objectionable whitening of the film. Finally, the waxes and soaps are all more or less soluble in hydrocarbon solvents, particularly at elevated temperatures, thereby suffering loss of flatness. Also improper milling, resulting in high temperature, will cause loss of flatting power. These flat materials cannot be used in finishes designed to be dried at elevated temperatures. The metallic soaps of fatty acids are sensitive to humidity and may cause great delay in drying of the films, as well in varnishes as in lacquers, and the films formed in humidity have a cheesy appearance.

I have invented an organic flatting agent of the metallic soap type which retains the transparency and non-settling characteristics of this type of flatting agent, and at the same time is resistant to hydrolysis, is sufficiently compatible with nitrocellulose films so that crazing on artificial leather is eliminated, and is considerably less soluble than the ordinary soaps used as flatting agents. In the preferred form of my invention, the solubility is so lessened that the flat material can be used in many baking finishes. This new material comprises a soap of rosin, the melting point of which has been increased by some reaction (e. g. hydrogenation, combined with phenolaldehyde resin, the Diels-Alder reaction with maleic anhydride, etc.), with a heavy metal of the group consisting of the alkaline earth metals, magnesium, zinc and aluminum, in the form of a powder of pigment particle size, the individual particles of which are coated with a film of casein. The casein is preferably rendered insensitive to water with treatment with formaldehyde, or other known hardening agents. The coated soaps of maleated rosins are exceptionally useful in finishes which are hardened by baking.

The powdered soap may be dispersed in oil, oleo-resinous, resinous, cellulose derivative, rubber and other film-forming compositions, by the use of ordinary dispersion machinery. The resultant films are more or less flat, depending on the percentage of flatting agent added; the flatting effect per unit weight compares favorably with that of the ordinary metallic soaps. However, the films are unique in that the toughness of the original glossy film is more nearly approximated than with ordinary soaps; this is particularly noticeable in artificial leathers, where the use of these flatting agents eliminates crazing.

I believe that the unusual results obtained are due largely to the use of modified rosin as a base for my new products. Rosin is miscible with practically all film-forming materials (except where its acidity interferes), and the heavy metal soaps of rosin are sufficiently like itself that they are readily soluble in common organic film-forming materials and in the common solvents. Therefore, these soaps of unmodified rosin cannot ordinarily be used as flatting agents. Even rosins modified with phenol formaldehyde, which are less soluble than rosin itself, yield soaps which are still too soluble for satisfactory use as flatting agents. Where the rosin is modified with maleic anhydride, or other acid having the

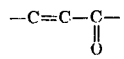

structure necessary for the Diels-Alder reaction with rosin (e. g. fumaric acid, citraconic and itaconic anhydrides), the resultant heavy metal soap is sufficiently insoluble to be useful as a flatting agent except in baking finishes. However, I increase the insolubility of all of these modified rosin soaps without interfering with their compatibility with resinous vehicles (as is evidenced by non-embrittlement and no-crazing thereof) by coating the modified rosin soap particles, as mentioned above, thus making usable in most finishes these modified rosin soaps which are insoluble to begin with. At the same time the light-fastness of films flattened with these coated modified rosin soaps is increased.

The rosin may be modified with any of the well known resinous and non-resinous materials which will combine therewith to yield a modified rosin of higher melting point. Preferably, the rosin is modified with an unsaturated acid of the type which will enter the Diels-Alder synthesis with the rosin, for the reasons already mentioned. The rosin may be modified to any desired degree with these materials, although substantially complete modification is preferred in order to obtain as great an increase in melting point (and often reduced solubility as well) as is possible.

Satisfactory flatting agents can be made as follows:

EXAMPLE 1—BASE RESIN

| | Pounds |
|---|---|
| N wood rosin | 300 |
| Maleic anhydride | 54 |

The materials were placed in a 200 gallon aluminum kettle, and heated to about 200° C. in 30 to 60 minutes. The batch was held at 200° C. for about 30 minutes, raised to 245° C. in about 30 minutes, and held for completion of the reaction for about 30 minutes. The melt was cast at about 180° C. and broken up. The acid number of the resin was 229 and the melting point was 115° C.

The resin was then made into a soluble soap, and precipitated with a salt of a heavy metal. A typical procedure is as follows:

*Preparation of flatting agent*

Thirty pounds of the base resin were saponified with 9 pounds of sodium hydroxide in 25 gallons of water, at the boil. To this solution was added a precipitating solution of aluminum sulfate, made by dissolving 26 pounds of aluminum sulfate in 6½ gallons of water. This was a slight (0.4 pound) excess of aluminum sulfate over theoretical. The two solutions were mixed with constant agitation, adding the aluminum sulfate until the solution was acid to litmus. The slurry so obtained was filtered and washed in a filterpress, until the sodium sulfate formed was washed out of the precipitate. The sulfate-free precipitate was added to 30 gallons of water, under agitation, until a uniform suspension resulted. A solution of 3 pounds of casein was then prepared, by dissolving the casein in 36 gallons of water by the aid of ammonium hydroxide. The pH of the casein solution was adjusted to between 10 and 10.5. The casein solution was slowly added to the soap slurry at room temperature, under agitation, and the casein was deposited on the surface of the soap particles by bringing the mixture to boil. The mixture was then filtered, washed and dried at 160° F. (to prevent spontaneous combustion which may occur at higher temperatures). The resultant powdery product was ready for incorporation in a coating composition.

To complete the deposition of the casein film, it may be advantageous to acidify the mixture by adding acetic acid to the slurry, until the pH reaches 4 or less. But in this event the coated soaps should be washed free of the ammonium acetate formed, using cold water for the purpose, in order not to redissolve some of the casein. The wash water should have a pH between 4.6 and 7.

I have discovered that somewhat improved results can be obtained by adding 1 pound of 40% aqueous formalin to the aqueous slurry after heating the mixture to the boil, and before filtration. In this case acidification is less important,

Example 2

Example 1 was repeated, by using 36 pounds of maleic anhydride and 300 pounds of rosin in making the base resin. The reaction conditions were otherwise unchanged. The resulting product was a flatting agent with somewhat higher solubility characteristics in organic solvents than the flatting agent made according to Example 1.

Instead of decreasing the proportion of maleic anhydride to rosin, the same may also be further increased.

Example 3

Example 1 was repeated, using the same base resin but using only half of the sodium hydroxide solution for the saponification of the full amount of the base resin (30 pounds), and also using half of the aluminum sulfate. The resulting flatting agent had the same proportion of maleic anhydride and rosin as in Example 1, but the aluminum content of the flatting agent was reduced, thereby decreasing the flatting power and increasing the solubility in organic solvents.

Besides changes in proportions of maleic anhydride, sodium hydroxide and aluminum sulfate with respect to the rosin, the physical properties of the products may be slightly modified by heating the mixture to different temperatures in making the base resin or in precipitating the coated aluminum soaps of the base resin. Also, other water-soluble aluminum salts may be used instead of aluminum sulfate for the precipitation, e. g. aluminum acetate.

Zinc, magnesium and alkali earth metals may also be used in place of aluminum to produce the insoluble soaps.

Example 4

Flat varnishes, lacquer and other coatings may be prepared with flatting agents made according to the present invention. A few examples are given herewith, to show typical proportions of flatting agent used to get a film with reduced sheen:

A. Lacquers

| | Per cent by weight |
|---|---|
| Flatting agent | 6 |
| Nitrocellulose | 12 |
| Damar resin | 6 |
| Tricresyl phosphate | 4 |
| Solvent consisting of 60% toluol, 20% ethyl acetate, 10% butyl acetate, and 10% butanol | 72 |

B. Varnishes

| | Per cent by weight |
|---|---|
| Flatting agent | 7 |
| 8 gallon long China-wood oil-modified phenolic varnish base | 25 |
| Mineral spirits | 68 |

C. Alkyd-urea varnish

| | Per cent by weight |
|---|---|
| Flatting agent | 7 |
| A glyceryl phthalate resin modified with 35% of soya bean oil | 17½ |
| A butanol - soluble urea - formaldehyde resin | 17½ |
| Solvesso #2 (hydrogenated petroleum naphthas boiling between 135 and 177° C.) | 40 |
| Butanol | 10 |
| Xylol | 8 |

D. Artificial leather coating

| | Per cent by weight |
|---|---|
| Flatting agent | 7 |
| Five second nitrocellulose | 10½ |
| Tricresyl phosphate | 13½ |
| Solvent mixture consisting of ½ ethyl acetate and ½ ethyl alcohol | 69 |

Example 5—Base Resin

| | Parts |
|---|---|
| N wood rosin | 100 |
| Phenol formaldehyde A-stage resin | 12 |

The N wood rosin is heated to 400° F. and the A-stage resin added gradually, reheating the mixture to 400° F. each time, and holding the mixture at 400° F. until the foam sets. Between addition of the different portions of the A-stage resin, it is advisable to wait until the foaming stops before adding the next portion. After all the A-stage resin has been added, the mixture is heated slowly to 475° F. and held for one hour, cooled to 350° F. and discharged.

Preparation of flattening agent

The procedure was the same as that described in Example 1.

Instead of a liquid A-stage phenol-formaldehyde resin, a rosin-soluble, solid condensation product of an alkyl-substituted phenol and formaldehyde, such as resin made from p-tertiary-butyl-phenol or p-tertiary-amyl-phenol, may be used.

In making the base resin of this example, the proportions of rosin to phenolic resin may be changed, as well as the reaction temperature. Also, other rosin reactive phenolic resins may be incorporated.

While I have shown only one method of putting the casein in solution, other known methods may be used, including the use of other alkalies such as sodium and potassium hydroxides, etc. Similarly, the casein may be deposited on the soaps in various known manners.

If desired, rosin compounds which are capable of being saponified (e. g. ester gum) may be substituted for the rosin in the preparation of these flattening agents.

The incorporation of the flattening agent into the various vehicles may be carried out either by preparing a concentrated paste of the flatting agent in the vehicle or in a solvent mixture, and then diluting the paste by the addition of further vehicle quantities; or the incorporation may be carried out in a single operation by grinding the flatting agent directly into the vehicle in the final proportions. The grinding may be carried out in pebble mills, roller mills, or with the aid of other suitable equipment.

The above examples are illustrations of the different embodiments of the present invention, and should not be considered as limiting its scope.

This application is a continuation-in-part of my application Serial No. 406,927, filed August 14, 1941.

I claim:

1. A new composition of matter useful as a flatting agent which is substantially transparent in conventional lacquer and varnish films, which comprises pigment size particles of a soap of a metal of the class consisting of aluminum, zinc, magnesium and the alkaline earth metals, and rosin which has been modified by chemical reaction to increase its melting point while leaving its carboxyl group free to form soaps coated with a film deposited from an aqueous solution of casein.

2. The composition of claim 1, in which the melting point of the rosin has been increased by hydrogenation.

3. The composition of claim 1, in which the melting point of the rosin has been increased by reaction with an alpha-olefinic dibasic acid.

4. The composition of claim 1, in which the melting point of the rosin has been increased by reacting with phenol-aldehyde condensation product.

5. A coating composition which dries to a substantially transparent dull or matte surface, which comprises a normally glossy drying non-aqueous organic film-forming vehicle containing hydrocarbon solvents, the films of which are dulled by the incorporation therein of pigment size particles of a soap of a metal of the class consisting of aluminum, zinc, magnesium and the alkaline earth metals, and rosin which has been modified by chemical reaction to increase its melting point while leaving its carboxyl group free to form soap, coated with a film deposited from an aqueous solution of casein.

LÁSZLÓ AUER.